July 5, 1938.  D. F. NEWMAN  2,122,890

PROJECTION SCREEN AND ART OF PRODUCING IT

Filed July 16, 1932   2 Sheets-Sheet 1

INVENTOR
David F. Newman
BY Ward, Crosby & Neal
ATTORNEYS

July 5, 1938. D. F. NEWMAN 2,122,890
PROJECTION SCREEN AND ART OF PRODUCING IT
Filed July 16, 1932 2 Sheets-Sheet 2
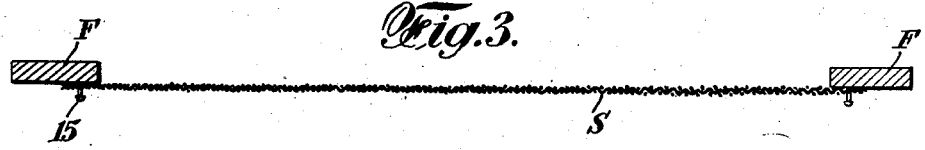
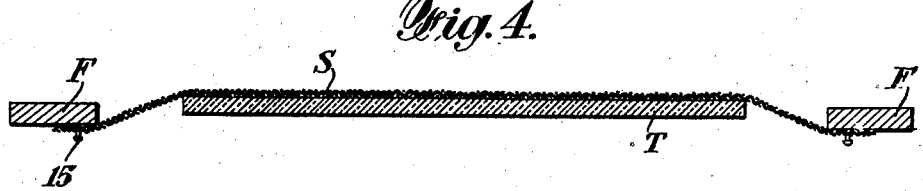
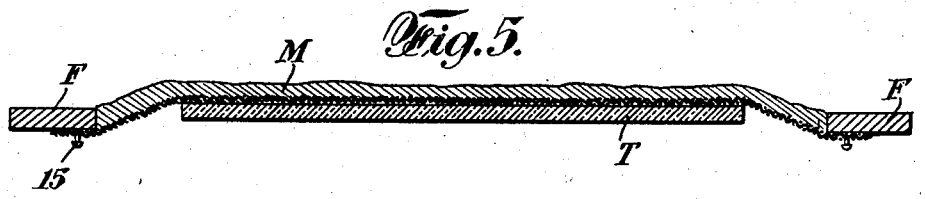
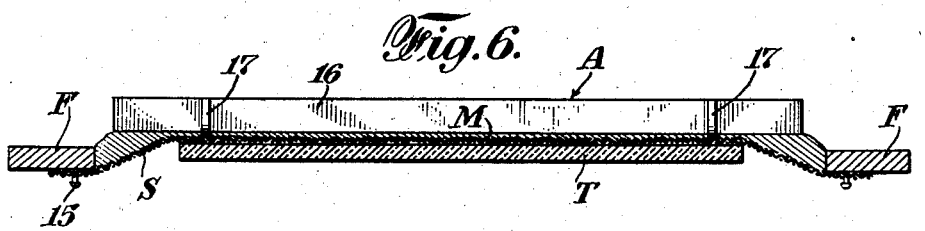
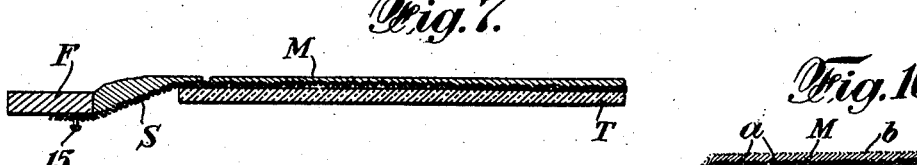
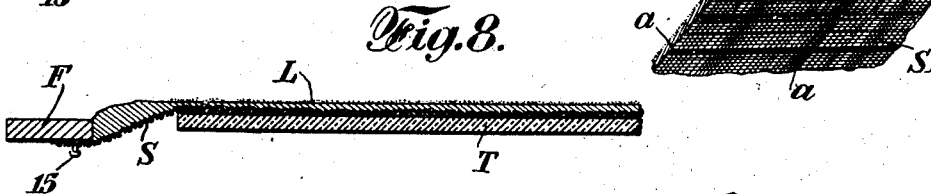
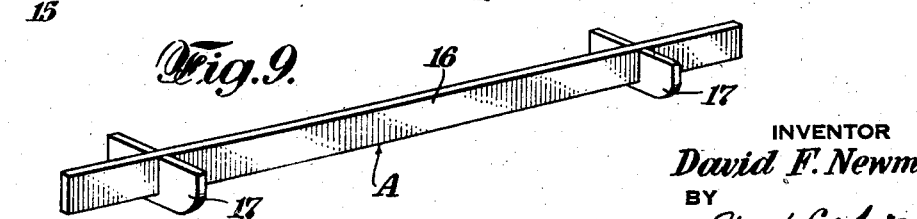
INVENTOR
David F. Newman
BY
Ward, Crosby & Neal
ATTORNEYS Patented July 5, 1938

2,122,890

UNITED STATES PATENT OFFICE 2,122,890

PROJECTION SCREEN AND ART OF PRODUCING IT

David F. Newman, Freeport, N. Y., assignor to Trans-Lux Corporation, a corporation of Delaware Application July 16, 1932, Serial No. 622,980

8 Claims. (Cl. 88—24)

My invention relates to a novel projection screen and to a method of and apparatus for producing projection screens in a novel and highly advantageous manner.

My invention, in one of its important phases, relates to a projection screen having novel features particularly as regards the light-diffusing characteristics thereof.

My invention also relates to a novel method of producing a screen for use in a projection system and particularly a rear projection system wherein the screen is disposed between the projector and the auditorium area.

My invention has further reference to a table for molding screens or other sheet-like structures from suitable viscous material.

Further objects, advantages and characteristics of my invention will become apparent from the following detailed description taken in connection with the accompanying drawings.

My invention resides in the screen, screen-producing art, novel methods and apparatus of the character hereinafter described and claimed.

For an understanding of my invention, reference is to be had to the accompanying drawings, in which:

Figs. 3, 4, 5, 6, 7 and 8 are vertical sectional views, partly in elevation, illustrating progressive stages of my screen-forming method;

Fig. 9 is a perspective view of a straight edge which is used for shaping the upper surface of the screen; and Fig. 10 is a perspective view of a part of a screen which illustrates a feature of the invention.

Figure 2:
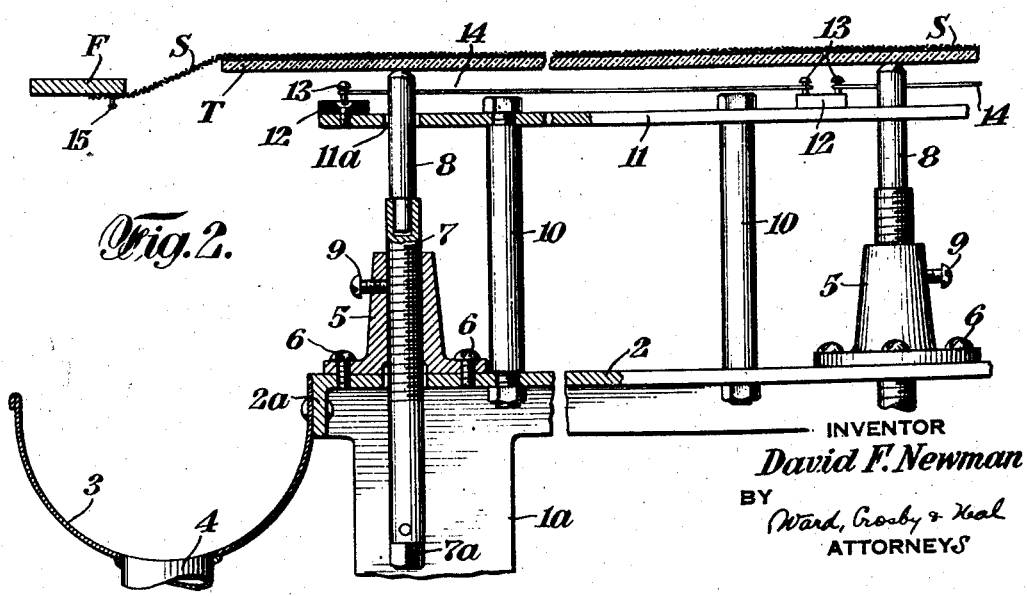
Fig. 2 is an elevational view, partly in section, of the table arrangement shown in Fig. 1.

Referring particularly to Fig. 2, I represents a suitable base having standards or uprights 1a adapted to rest upon a floor or other level surface. Carried by the base 1 is a plate-like member 2 preferably of square or rectangular configuration and terminating along each side thereof in a downwardly directed flange 2a. Suitably secured to the flange 2a is an overflow trough or channel 3 which, preferably, comprises a discharge outlet 4.

Upstanding from the aforesaid member 2 are a plurality of supports 5 each of which may comprise an enlarged base suitably secured to said member 2, as by a plurality of screws 6. Each of the supports 5 is provided with a vertical, internally threaded passage which receives, in threaded relation, a rod 7 formed preferably of suitable metallic material and carrying, at its upper end, a supporting member 8 formed preferably of hard rubber or other suitable electricity-insulating material. As shown particularly in Fig. 1, a plurality of the supporting members 8 are thus provided and these are disposed preferably in symmetrical relation. In accordance with the invention, the supporting members 8, at their upper ends, support a molding table T formed from glass, or other suitable material. Each of the rods 7, at the lower end thereof, is suitably fashioned as indicated at 7a for the reception of a suitable tool whereby said rods 7 may be vertically adjusted to a desired degree so that the table T may be precisely leveled in a horizontal plane. To the end that each rod 7 may be securely retained in an adjusted position, there is preferably provided a set screw 9 which is threaded through an opening in the support 5 laterally toward the rod 7 and which coacts therewith to lock the same in an adjusted position.

With some kinds of screen-forming material, it is desirable that the molding table T may be maintained well above room temperature during the molding operation. To this end, there may be utilized a heating arrangement for said table T and, with the form of my invention herein shown, there is provided for this purpose a plurality of standards 10 which upstand from the aforesaid member 2 and, at their upper ends, support a plate-like member 11 which is provided with suitable passages 11a for free extension therethrough of the respective aforesaid supporting members 8. As shown particularly in Figs. 1 and 2, the member 11, along opposite edges thereof and substantially at the middle thereof carries strips 12 of suitable insulating material, as hard rubber or the like. Upstanding from each strip 12 are a plurality of spaced members 13 around and on which a suitable electrical conductor 14, as nichrome, is spirally arranged, the ends of said conductor 14 being adapted for association with a suitable source of electrical energy.

As shown on the drawings, the table T is preferably either square or rectangular. Adapted for association with the table T is a frame F which conforms in configuration substantially with that of the table T although enclosing a somewhat greater area as shown particularly in Fig. 1.

In accordance with my invention, the frame F is adapted to have a suitable fabric sheet S secured thereto in suitable taut condition as shown in Fig. 3. For thus securing the fabric sheet S to the frame F, there may be utilized tacks 15, or the like. The fabric sheet S may be of any suitable character such, for example, as georgette crepe or knit fabric, the latter as described in my pending application Serial No. 512,533, filed January 31, 1931.

Figure 1:
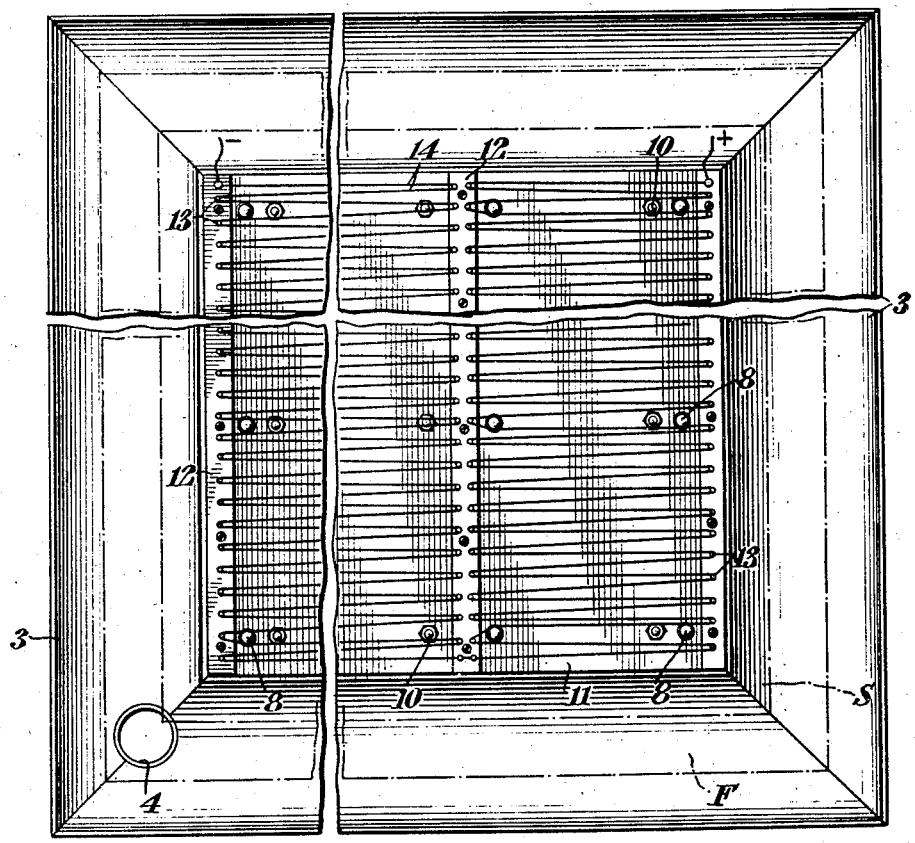
Fig. 1 is a plan view, with parts omitted, of a molding table as constructed in accordance with my invention.

With the fabric sheet S secured to the frame F as shown in Fig. 3, the combined frame and sheet may be associated with the table T as shown particularly in Figs. 1 and 4. In so doing, said fabric sheet S, which preferably is slightly greater in area than that of the table T, comes to rest upon the latter, the frame F being suspended in space and supported solely by the fabric sheet S. In this manner, said fabric sheet S is maintained under suitable tension in direct contacting relation with the upper surface of the table T. The viscous material may now be deposited thereon.

In Fig. 5, I have illustrated the screen in its partly completed condition as it exists after a layer of viscous screen-forming material M has been more or less evenly applied to and over the fabric sheet S as the latter rests upon the table T. The character of this screen-forming material will be hereinafter particularly described.

After the aforesaid viscous material has been deposited on the fabric sheet S as described above, it should be brought to substantially the thickness which the screen is to have when completed. This operation may be performed in any suitable manner. As herein illustrated, a device A is thus utilized, Fig. 9, this device comprising a bar 16 having a plane lower surface, said bar 16 having runners 17 attached thereto adjacent opposite ends thereof. The runners 17 are adapted to rest upon the fabric sheet S and table T, the distance between the runners 17 determining one transverse dimension of the screen and the distance between the lower surface of the bar 16 and the upper surface of the table T determining substantially the final thickness of the completed screen. Accordingly, with the device D positioned as shown in Fig. 6, it is moved across the table T transversely of the direction in which the bar 16 extends whereby the runners 17 track substantially parallel grooves in the layer of screen-forming material and the upper surface of the latter is brought to plane configuration. The screen as it exists at the completion of this operation is shown in Fig. 7.

In accordance with an important phase of my invention, suitable comminuted light-diffusing material, as finely divided glass, is applied to the upper surface of the partially completed screen as it rests upon the table T. It is highly desirable that this light-diffusing material be thus applied to the screen while said screen is in plastic condition. When thus applied, the light diffusing material adheres to or unites with the screen in a highly advantageous and practical manner. Said light-diffusing material is advantageously applied to the screen surface by an air gun or in other suitable manner whereby a layer L thereof is formed on the upper screen surface as shown in Fig. 8. After the upper surface of the screen has been suitably covered by the aforesaid light-diffusing material and after the proper time interval has elapsed any excess or non-adhering material may be brushed or blown away whereby the upper screen surface retains only a relatively thin coating of said light-diffusing material.

Ordinarily, screens of the character herein described and claimed are utilized for rear projection purposes. Under such circumstances, the aforesaid viscous screen-forming material should be of such character that the completed screen has the desired degree of translucency. Any suitable screen-forming material may thus be utilized such, for example, as disclosed in Payne-Newman application Serial No. 72,029, filed November 28, 1925, which has become U. S. Patent No. 1,881,128, dated Oct. 4, 1932, or in my aforesaid application Serial No. 512,533. If the screen-forming material is to be of the character just stated, the screen body material may comprise suitably proportioned amounts of gelatine, glycerine and water with which there may be combined or associated one or more agents imparting a desired characteristic or characteristics to the completed screen. Thus, there may be incorporated in the screen-forming body material a light-diffusing agent, a light-filtering agent, and an agent having germicidal, bactericidal, fungicidal and/or preservative qualities, and a curing agent, it being distinctly understood, however, that the use of one or more of these agents is optional.

After the screen has been completed to the extent hereinbefore described, it may be allowed to cool. Thereafter, the edges of the screen may be trimmed to a desired size and a suitable binding applied thereto as desired.

In lieu of screen body material formed principally from gelatine and glycerine as stated above, it shall be understood that the screen body may be formed from other suitable material such, for example, as cellulose-acetate material as described in my pending application Serial No. 490,818, filed October 23, 1930. With material of the character last noted, the table may remain at room temperature during the screen-forming operation.

When cellulose-acetate material, or equivalent, is thus utilized as the screen body, the aforesaid comminuted light-diffusing material may be applied to the upper surface at such time as may be suitable, provided, however, that such surface should be of such character that some of the applied comminuted material adheres thereto in a desired manner.

An important feature of the present invention is illustrated in Fig. 10 which illustrates the fabric sheet S1 as formed from georgette crepe. As more particularly pointed out in my aforesaid application Serial No. 512,533, fabric of this character is characterized by having internal bands, so called, and other irregularities rendering the fabric somewhat objectionable for screen uses because causing said screen to be of non-uniform appearance during projection. When such a fabric sheet S1 is included in the screen, I have discovered that a proper application of the aforesaid comminuted light-diffusing material substantially or entirely eliminates non-uniform screen appearance during projection. In Fig. 10, I have indicated the aforesaid internal band and irregularities at $a$, the comminuted light-diffusing material being shown at $b$ as blanketing said internal band and irregularities.

The hereinbefore described fabric sheets S or S1 serve as supports to impede or prevent sag of the screen when it is suspended vertically for projection purposes. These fabric sheets in a desired manner function to diffuse light passing through the screen. The advantages of the layer of comminuted light-diffusing material L have been in part heretofore explained. Further, by using such comminuted material, it becomes practical to greatly decrease the quantity of or even entirely eliminate the light-diffusing agent which, as stated, may be included in the translucent screen-forming material. I have demonstrated that a screen constructed in accordance with my present invention has a higher light-transmission factor than do screens of the prior art.

Although I have illustrated and described the fabric sheets S and S1 and the layer of comminuted material L as on opposite sides of the screen, it shall be understood that my invention is not to be thus limited. If desired, said fabric sheets and the layer of comminuted material may be disposed on the same side of the sheet of translucent material, the layer of comminuted material preferably being outermost.

While the invention has been described with respect to certain particular preferred examples which give satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. A projection screen comprising a sheet-like translucent body, and a plurality of layers of light-diffusing material associated with said translucent body, one of said layers being a fabric sheet and another of said layers being formed from comminuted material.

2. A projection screen comprising a translucent body, a fabric sheet of irregular weave associated with said translucent body, and a layer of comminuted light-diffusing material on one face of said translucent body, the density of said comminuted material being sufficient to preclude objectionable observation of the irregular weave condition of said fabric during projection of a light beam through the screen.

3. A projection screen comprising a translucent body formed from viscous material, a sheet of georgette crepe associated with said translucent body, and a layer of comminuted light-diffusing material on one face of said translucent body, the density of said comminuted material being sufficient to preclude objectionable observation of irregularities in the weave of said sheet of crepe during projection of a light beam through the screen.

4. A projection screen comprising a sheet-like translucent body, a light-diffusing agent substantially uniformly incorporated therein, and a plurality of layers of light-diffusing material associated with said translucent body, one of said layers being a fabric sheet and another of said layers being formed from comminuted material.

5. A projection screen comprising a sheet-like translucent body, a light-diffusing agent substantially uniformly incorporated therein, and a plurality of layers of light-diffusing material associated with said translucent body, one of said layers being a fabric sheet and another of said layers being formed from comminuted material, the comminuted material being secured to the translucent body by the adhesive action of said translucent body.

6. A projection screen comprising a sheet-like translucent body, and a plurality of layers of light-diffusing material associated with said translucent body, one of said layers being a fabric sheet and another of said layers being formed from comminuted material, the comminuted material being adhesively secured on one exterior face of said translucent body.

7. A projection screen comprising a sheet-like translucent body, and a plurality of layers of light-diffusing material associated with said translucent body, one of said layers being a fabric sheet and another of said layers being formed from comminuted material, the comminuted material being secured to the translucent body by the adhesive action of said translucent body.

8. A projection screen comprising a sheet-like translucent body, a light-diffusing agent substantially uniformly incorporated therein, and a plurality of layers of light-diffusing material associated with said translucent body, one of said layers being a fabric sheet embedded in said translucent body and another of said layers being formed from comminuted glass, the comminuted glass being secured to the translucent body by the adhesive action of said translucent body.

DAVID F. NEWMAN.